Figure 1:
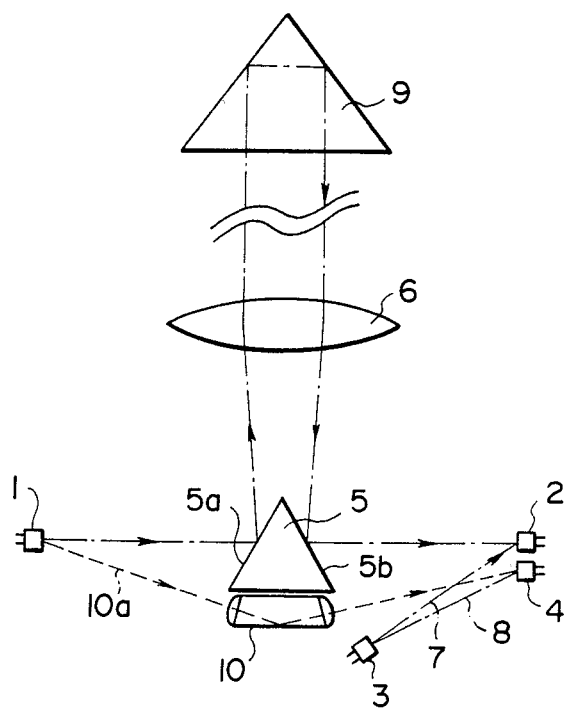

United States Patent [19]

Ohtomo

[11] Patent Number: 4,531,833
[45] Date of Patent: Jul. 30, 1985

[54] OPTICAL RANGE FINDER

[75] Inventor: Fumio Ohtomo, Tokyo, Japan

[73] Assignee: Tokyo Kogaku Kikai Kabushiki Kaisha, Tokyo, Japan

[21] Appl. No.: 411,533

[22] Filed: Aug. 25, 1982

[30] Foreign Application Priority Data

Aug. 31, 1981 [JP] Japan .................. 56-136594

[51] Int. Cl.³ .............................. G01C 3/08
[52] U.S. Cl. ............................. 356/5; 356/4
[58] Field of Search .............. 356/5, 4; 343/9 PS

[56] References Cited

U.S. PATENT DOCUMENTS

| 3,520,611 | 7/1970 | Picou | 356/72 |
| 3,619,058 | 11/1971 | Hewlett | 356/5 |
| 4,165,936 | 8/1979 | Eisenring et al. | 356/5 |
| 4,403,857 | 9/1983 | Hölscher | 356/5 |
| 4,413,904 | 11/1983 | Hamada et al. | 356/5 |

FOREIGN PATENT DOCUMENTS

| 2346183 | 9/1973 | Fed. Rep. of Germany | 356/5 |
| 53-68268 | 6/1978 | Japan | 356/5 |
| 0131578 | 8/1983 | Japan | 356/5 |
| 2819321 | 12/1978 | Netherlands | 356/5 |
| 0734504 | 5/1980 | U.S.S.R. | 356/5 |

Primary Examiner—S. C. Buczinski
Assistant Examiner—John B. Sotomayor
Attorney, Agent, or Firm—Brumbaugh, Graves, Donohue & Raymond

[57] ABSTRACT

An optical range finder comprising first and second light emitting sources, and first and second light receiving sources, the light emitting and receiving sources being so arranged as to form four optical paths between the first light emitting source and the first light receiving source, the first light emitting source and the second light receiving source, the second light emitting source and the first light receiving source, and the second light emitting source and the second light receiving source, at least one of the optical paths being a distance measuring optical path passing an object, the other optical paths being reference optical paths.

6 Claims, 4 Drawing Figures

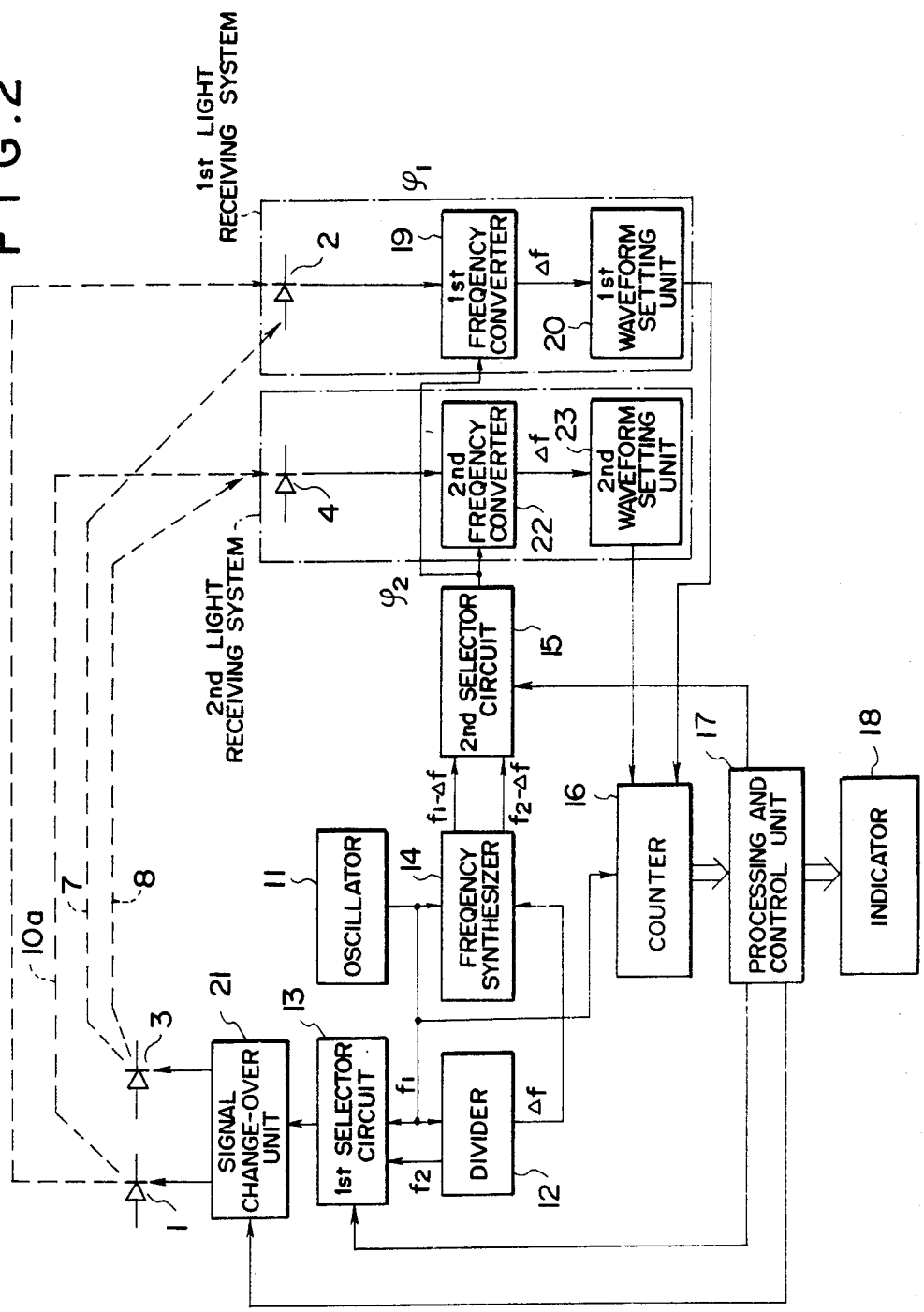

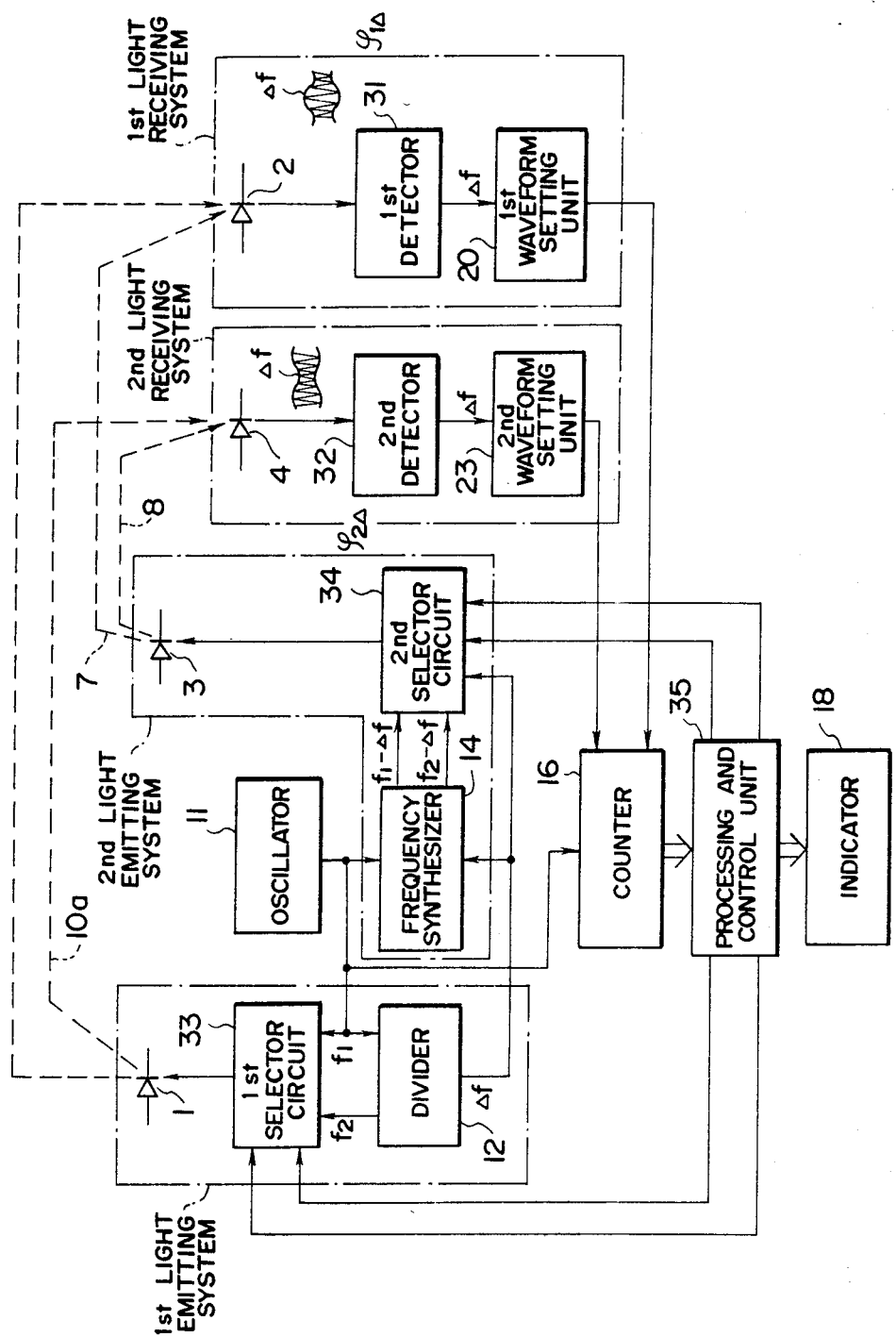

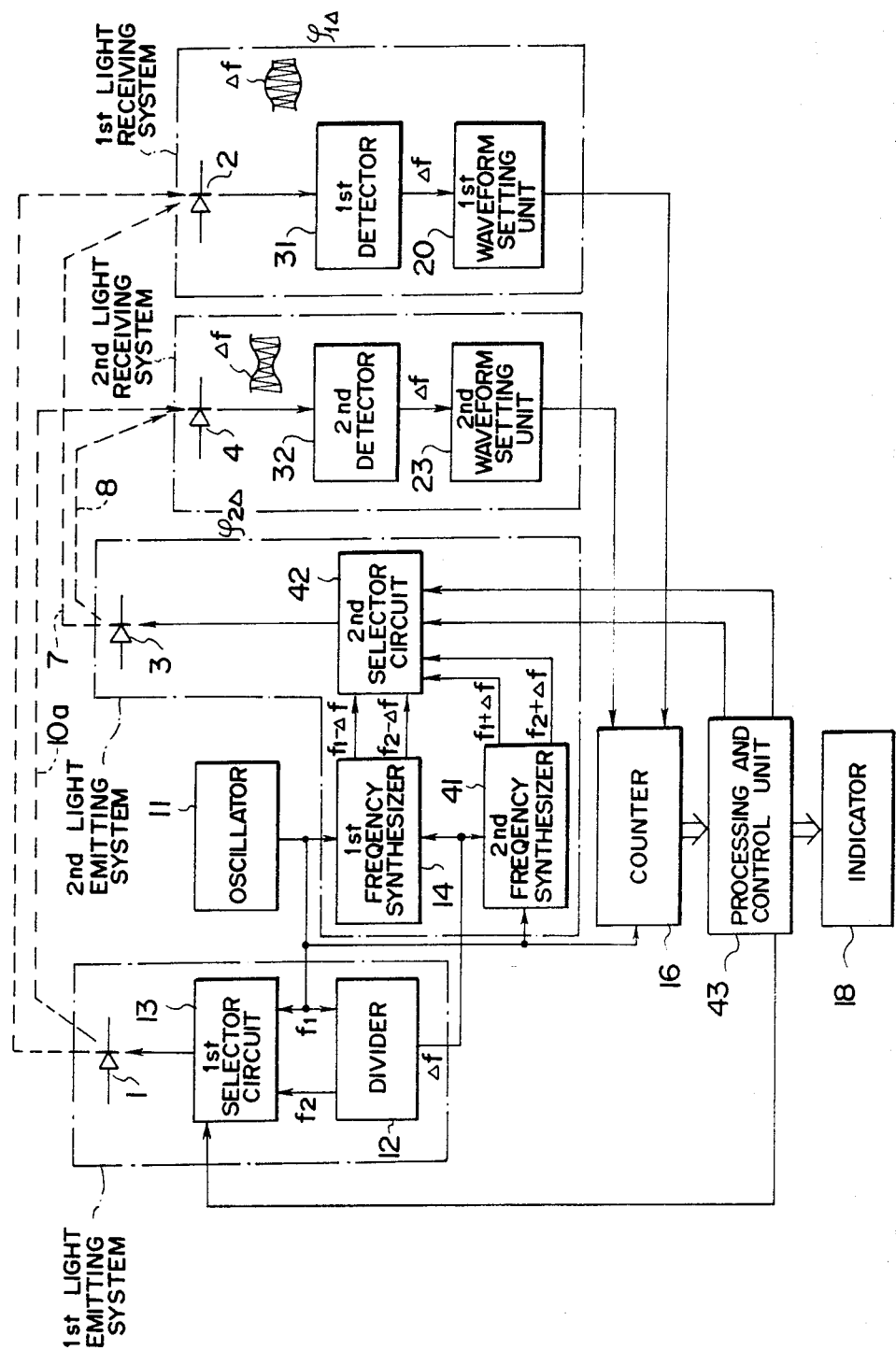

4,531,833

OPTICAL RANGE FINDER

This invention relates to an optical range finder.

An optical range finder includes a light emitting source consisting usually of a light emitting diode, and a light receiving source which is adapted to receive the light which has been emitted by the light emitting source and reflected by an object so as to determine the distance to the object on the basis of the difference between the phase of the emitted light and that of the light entering the light receiving source. In this type of optical range finder, it is known that variations in the phase difference with respect to variations in distance increase in proportion to the modulation frequency of the emitted light. Therefore, to improve the accuracy of the optical range finder, it is desirable to increase the modulation frequency within a permissible range with respect to a response time in the range finder. When, for example, a modulation frequency of 15 MHz, which corresponds to a wavelength of 20 m, is used, the phase difference varies 360° every time the distance between the range finder and an object varies at 10 m. This means that no distance greater than 10 m can be measured at a certain modulation frequency. In a conventional optical range finder, more than two different modulation frequencies are used in view of the above points. When, for example, a frequency of 75 KHz, which corresponds to a wavelength of 4 Km, is used as a second modulation frequency, a distance can be measured roughly with the light of a second modulation frequency, and precisely with the light of a first modulation frequency, and a final measurement value can be obtained by synthesizing the results of the rough and precise measurements. If the number of modulation frequencies in use are increased, a longer distance can be measured. In order to improve the resolving power with respect to the measurement, it is desirable to convert the frequency to a frequency of a lower level and expand the phase in the direction of the time axis, for measuring phase difference. A conventional optical range finder employs such a measuring principle.

The whole of a distance measuring process including the measurement of phase difference and the calculation of a measured distance is carried out in a control circuit having a plurality of electronic elements. The responding speed of each element in the circuit is limited, and a delayed response adversely affects the results of detection of phase difference, and causes measurement errors. The delays of response occurring in the electronic elements differ with the temperatures thereof. In a light emitting diode in particular, which is used as a light source, and which requires a high output, a temperature rise necessarily occurs due to the heat generated in itself. Therefore, the fluctuation of phase in the light emitting diode increases.

In order to settle such problems in a conventional optical range finder, an inner reference optical path for introducing the light from a light emitting source to a light receiving source is provided therein to compare the light which has passed through a distance measuring optical path with the light which has passed through the inner reference optical path, and thereby eliminate the ill effects of the delayed response occurring in the electronic elements in the control circuit. This range finder is so formed that the distance measuring light passing through the distance measuring optical path and the reference light passing through the inner reference optical path are mechanically shifted by an optical path change-over unit to cause the light to enter the light receiving source alternately. However, shifting the light by the optical path change-over unit takes considerable time, and the light shifting time extends the phase measuring time. Consequently the total distance measuring time increases. This has no ill effect on the results of measurement conducted for a stationary object but, when an object is moving, the distance cannot be measured in accordance with the movement thereof. Since the optical path change-over unit has moving parts, it often malfunctions due to the lubrication failure wear or dust collecting on parts; consequently, it is not reliable. As described above, the degree of variations in phase in the light source is greater than that in any other constructional element of a range finder. To improve the distance measuring accuracy, it is desirable that the measurement of the distance measuring light and reference light be conducted at two closest possible instants but the optical path change-over unit does not meet this requirement.

An object of the present invention is to provide an optical range finder having no mechanical optical path change-over means and capable of measuring a distance of an object in strict accordance with the condition thereof.

Another object of the present invention is to provide an optical range finder capable of eliminating the ill effects of a delayed response occurring in a light emitting source and other electronic elements, and carrying out a distance measuring operation with great accuracy and at a high speed.

The optical range finder according to the present invention comprises first and second light emitting sources, and first and second light receiving sources, the light emitting and receiving sources being so arranged as to form four optical paths between the first light emitting source and the first light receiving source, the first light emitting source and the second light receiving source, the second light emitting source and the first light receiving source, and the second light emitting source and the second light receiving source, at least one of the optical paths being a distance measuring optical path passing an object, the other optical paths being reference optical paths. More preferably, the optical range finder according to the present invention comprises first and second light emitting sources, and first and second light receiving sources, a distance measuring optical path being formed between the first light emitting source and the first light receiving source so as to extend from the first light emitting source to the first light receiving source via an object, reference optical passages, which do not pass the object, being formed between the first light emitting source and the second light receiving source and between the second light emitting source and the first and second light receiving sources. Since the light is sent out from the first or second light emitting source to the first and second light receiving sources at once to measure the difference between the phases therein, the ill effect of a phase delay in the first and second light emitting sources can be eliminated. When light having the same frequency is radiated alternately from the first and second light emitting sources in the range finder constructed as mentioned above, and assuming that $\theta_1$ represents the phase delay caused by the light sent out from the first light emitting source to pass through the distance measuring optical path, $\theta_2$ represents the phase delay caused by the light sent out from the first light emitting source to pass through the reference optical path extending to the second light receiving source, $\theta_3$, $\theta_4$ are phase delays caused by the light sent out from the second light emitting source to pass through the reference optical paths extending to the first and second light receiving sources, and $\phi_1$, $\phi_2$ are phase delays caused by delayed responses occurring in the elements related to the first and second light receiving sources; then, the relation, $$\theta_1 - \phi_1 = A$$

$$\theta_2 - \phi_2 = B$$

$$A - B = (\theta_1 - \theta_2) - (\phi_1 - \phi_2)$$

can be established in connection with the first light emitting source, and the relation, $$\theta_3 - \phi_1 = C$$

$$\theta_4 - \phi_2 = D$$

$$C - D = (\theta_3 - \theta_4) - (\phi_1 - \phi_2)$$

can be established in connection with the second light emitting source. Therefore, the equation, $(A-B)-(C-D)=\theta_1-\theta_2-\theta_3+\theta_4$ can be obtained. Since $\theta_2$, $\theta_3$, $\theta_4$, are known, $\theta_1$ can be determined. This computation can be applied to both a frequency for the rough measurement of a distance and a frequency for the accurate measurement of a distance.

In another mode of the invention, the light, the frequency of which is slightly different from that of the light from the first light emitting source, is sent out from the second light emitting source at the same time that the light is sent out from the first light emitting source, to permit heterodyned light to enter the first and second light receiving sources. Thus, signals processed in the first and second light receiving sources are measured as only components of a frequency corresponding to the difference between the frequencies of the light from the first and second light emitting sources. In this case, a phase delay caused by a response delay in an element between the first and second light emitting sources can be eliminated by sending out light having a frequency corresponding to the above-mentioned frequency difference from the second light emitting source, to be received by the first and second light receiving sources.

In still another mode of the invention, two kinds of light, i.e. the light having a frequency slightly on the positive side with respect to the frequency of the light from the first light emitting source, and the light having a frequency slightly on the negative side with respect to the frequency of the light from the first light emitting source, is radiated from the second light emitting source, and the phase difference in the electric system is eliminated from the advanced-phase condition or delayed-phase condition.

The above and other objects and features of the present invention will become apparent from the following descriptions of preferred embodiments taking reference to the accompanying drawings, in which:

FIG. 1 is a schematic diagram of an optical system of an embodiment of the present invention; and FIGS. 2-4 show different examples of control circuits.

Referring now to the drawings, particularly to FIG. 1, it will be noted that the optical range finder is provided with a first light emitting diode 1, a first light receiving diode 2, a second light emitting diode 3, and a second light receiving diode 4. The range finder is further provided therein with a prism 5 having a surface 5a of reflection for reflecting thereon the light, which is sent out from the first light emitting diode 1, to direct the light to an object, for example, a corner cube 9 placed in a point of measurement, and a surface 5b of reflection for reflecting thereon the light, which is reflected on the corner cube 9 and returns to the prism 5, to direct the light to the first light receiving diode 2. An objective lens 6 is provided for introducing as parallel light the light reflected on the surface 5a of reflection of the prism 5 to the corner cube 9, and introducing the light reflected on the corner cube 9 to a light receiving surface of the first light receiving diode 2 via the surface 5b of reflection to form an image thereon.

Behind the prism 5, an optical system 10 is provided, which is adapted to form an inner optical path 10a for introducing the light from the first light emitting diode 1 to the second light receiving diode 4. The optical system 10 may be any known optical device for directing light emitted from diode 1 incident upon the second light receiving diode 4. Inner reference optical paths 7, 8 are formed, which are used to introduce the light from the second light emitting diode 3 to the first and second light receiving diodes 2, 4.

FIG. 2 shows an example of a control circuit. An oscillator 11 is adapted to generate a signal of a first modulation frequency $f_1$, which is supplied to a divider 12, a first selector circuit 13, a frequency synthesizer 14, and a counter 16. The divider 12 is adapted to divide a signal of a first modulation frequency and generate a signal of a second modulation frequency, which is applied to the first selector circuit 13. The divider 12 is also adapted to further divide the signal of a first modulation frequency $f_1$ to generate a signal of a predetermined frequency $\Delta f$, a division of $f_1$, which is applied to the frequency synthesizer 14. The counter 16 is adapted to apply a signal representative of a counted value to a processing and control unit 17, a microprocessor programmed to carry out the operations described below. The first selector circuit 13 is adapted to receive a signal from the processing and control unit 17, select one of the signals of first and second modulation frequencies in accordance with the mentioned signal received thereby, and apply the selected signal to a signal change-over unit 21.

The signal change-over unit 21 also receives a signal from the processing and control unit 17 to supply selectively in accordance with this signal a signal from the first selector circuit 13 to the first light emitting diode 1 or second light emitting diode 3. These light emitting diodes are adapted to radiate the light, the frequency of which has been modulated in accordance with the signal from the first selector circuit 13.

The frequency synthesizer 14 is adapted to receive signals from the oscillator 11 and divider 12 to generate signals having frequencies $f_1 - \Delta f$ and $f_2 - \Delta f$ and apply them to a second selector circuit 15. The second selector circuit 15 is adapted to receive a signal from the processing and control unit 17 and select in accordance with this signal one of the signals having frequencies $f_1 - \Delta f$ and $f_2 - \Delta f$.

The first and second selector circuits 13, 15 are known switching circuits combining NAND and NOR gates, for example, of the type designated 1 and 7 shown in my copending application, Ser. No. 240,256, filed Mar. 4, 1981, now U.S. Pat. No. 4,413,904, issued Nov. 8, 1983.

The first light receiving diode 2 is adapted to receive the light from the first light emitting diode 1 through the measuring optical path, and the light from the second light emitting diode 3 through an inner reference optical path 7, generate an electric signal in accordance with the signal received thereby, and apply the electric signal to a first frequency converter 19. The second light receiving diode 4 is adapted to receive the light from the first light emitting diode 1 through an inner reference optical path 10a, and the light from the second light emitting diode 3 through an inner reference optical path 8, generate an electric signal in accordance with the signal received thereby, and apply the electric signal to a second frequency converter 22. The first frequency converter 19 is adapted to receive an output from the second selector circuit 15, mix the same with a signal from the first light receiving diode 2 and form a heterodyned signal, and obtain a signal of a frequency $\Delta f$ from the heterodyned signal and output the same signal. Also, the second frequency converter 22 is adapted to receive an output from the second selector 15, obtain a signal of a frequency $\Delta f$ from the output mentioned above and a signal from the second light receiving diode 4, and output the signal of a frequency $\Delta f$. The outputs from the frequency converters 19, 22 are applied to first and second waveform setting units 20, 23. These waveform setting units 20, 23 are adapted to convert the sine waves of a frequency $\Delta f$ from the converters 19, 22, to rectangular waves of the same frequency, and apply the signals having such waves to the counter 16.

The counter 16 utilizes as a start signal a rising part or a falling part of a signal of a frequency $\Delta f$ from the waveform setting unit 20, and as a stop signal a rising part or a falling part of a signal of a frequency $\Delta f$ from the waveform setting unit 23, to count the time difference between the generation of start and stop signals by utilizing as a clock signal a signal of a frequency $f_1$ from the oscillator 11. The processing and control unit 17 is adapted to control the relation between outputs from the first and second selector circuits 13, 15 in such a manner that, when the frequency of an output from the circuit 13 is $f_1$, the frequency of an output from the circuit 15 is $f_1 - \Delta f$, and in such a manner that, when the frequency of an output from the circuit 13 is $f_2$, the frequency of an output from the circuit 15 is $f_2 - \Delta f$. The counted values obtained from the counter 16 in these two cases are converted to distances, which are combined to display the resulting value as a measurement value on an indicator 18.

In this embodiment, the light from the first and second light emitting diodes 1 and 3 is supplied simultaneously to the first and second light receiving diodes 2 and 4, and an output signal from the second selector circuit 15 is also supplied to the first and second frequency converters 19 and 22 immediately. Accordingly, the influence of variations in phase occurring in the light emitting diodes 1 and 3, second selector circuit 15, and a block in a step preceding the circuit 15 can be eliminated. The influence of variations in phase occurring in the first and second light receiving systems, i.e. the first and second light receiving diodes 2 and 4, frequency converters 19 and 22, and waveform setting units 20 and 23 can be eliminated by controlling the signal changeover unit 21 with an output from the processing and control unit 17. The elimination of influence of variations in phase occurring in the first and second light receiving systems will be described in detail. Let $\theta_1$ equal variations in phase due to the distance measuring optical path, $\theta_2$ variations in phase due to the inner optical path 10a, $\theta_3$ and $\theta_4$ variations in phase due to the reference optical paths 7 and 8, and $\phi_1$ and $\phi_2$ variations in phase due to the first and second light receiving systems. When the light is sent out from the first light emitting diode 1, the phase difference appearing on the counter 16 equals the difference obtained by subtracting the output from the second light receiving system from the output from the first light receiving system, and the phase difference $A'$ can be expressed by the equation, $$A' = (\theta_1 + \phi_1) - (\theta_2 + \phi_2) \ldots \quad (1)$$

When the light is sent out from the second light emitting diode 3, the phase difference $B'$ appearing on the counter 16 can be expressed by the equation, $$B' = (\theta_3 + \phi_1) - (\theta_4 + \phi_2) \ldots \quad (2)$$

In the processing and control unit, the phase difference $B'$ is subtracted from the phase difference $A'$ to obtain the result in accordance with the formula, $$A' - B' = \theta_1 - \theta_2 + \theta_4 - \theta_3 \ldots \quad (3)$$

Since $\theta_2, \theta_3, \theta_4$ are known, $\theta_1$ can be determined by carrying out computation. This operation can be carried out with respect to both of the two frequencies $f_1$ and $f_2$.

FIG. 3 shows another embodiment of the present invention. In this embodiment, while light is sent out from a first light emitting diode 1, light is radiated from a second light emitting diode 3, the frequency of which is slightly different from that of the light from the diode 1, thereby heterodyning the light entering first and second light receiving elements 2 and 4. Thus, the signals to be processed in the first and second light receiving systems are only such components having a frequency equal to the difference between the frequencies of these signals. In order to eliminate phase difference occurring due to the first and second light receiving systems, the light having a frequency equal to the above-mentioned frequency difference is radiated from the second light emitting diode.

In this embodiment, the signal change-over unit 21 provided in the previously-described embodiment is omitted, and a first selector circuit 33 corresponding to the first selector circuit 13 in the previously-described embodiment is so provided as to apply an output therefrom to the first light emitting diode 1. A processing and control unit 35 corresponding to the processing and control unit 17 in the previous embodiment is adapted to apply an output therefrom to the first selector circuit 33 and thereby control the emission of light from the first light emitting diode 1. A second selector circuit 34 corresponding to the second selector circuit 15 in the previous embodiment is adapted to receive an output from the processing and control unit 35, and control the second light emitting diode 3 in accordance with the mentioned output. The second light emitting diode 3 is adapted to radiate the light of a frequency $f_1 - \Delta f$ or $f_2 - \Delta f$ while the light of a frequency $f_1$ or $f_2$ is radiated from the first light emitting diode 1, and the light of a frequency $\Delta f$ while no light is radiated from the first light emitting diode 1. Accordingly, the first and second light receiving diodes 2 and 4 receive the light from the first and second light emitting diodes 1 and 3 to generate signals, the amplitude of which vary with the frequency $\Delta f$. The outputs from the light receiving diodes 2 and 4 are input into first and second detectors 31, 32, respectively, from which signals of a frequency $\Delta f$ are outputted. The outputs from the detectors 31 and 32 are input into first and second waveform setting units 20 and 23, respectively. The outputs from these waveform setting units are applied to a counter 16 in the same manner as in the previous embodiment.

In this embodiment, the light is supplied from the first and second light emitting diode 1 and 3 simultaneously to both of the first and second light receiving diodes 2 and 4, and the difference between the phases in the first and second light receiving systems is measured by the counter 16. Accordingly, the influence of variations in phase occurring in the first and second light emitting diodes and light control circuits therefore (first and second light emitting systems) can be eliminated. The influence of variations in phase occurring in the first and second light receiving systems is eliminated by the processing and control unit 35, which is so formed as to control the first and second selector circuits 33 and 34. The elimination of the influence of variations in phase in the first and second light receiving systems will be described in detail. When no light is sent out from the first light emitting diode 1 with modulated light of a frequency $\Delta f$ radiated from the second light emitting diode 3, signals of a frequency $\Delta f$ are output from the light receiving diodes 2 and 4, and outputs similar to those from the diodes 2 and 4 are generated in the detectors 31 and 32. The phase difference C' obtained from the counter 16 in the above condition is determined. The phase difference C' can be expressed by the equation, $$C' = (\theta_{3\Delta} + \phi_{1\Delta}) - (\theta_{4\Delta} + \phi_{2\Delta}) = (\theta_{3\Delta} - \theta_{4\Delta}) + (\phi_{1\Delta} - \phi_{2\Delta}) \quad (4)$$

wherein the symbol $\Delta$ represents a phase delay in the case where the frequency is $\Delta f$; and $\theta_{3\Delta} - \theta_{4\Delta}$ is known. This value is extremely small when the frequency $\Delta f$ is sufficiently low, for example, 3 KHz, and it can be neglected.

When light having a frequency $f_1$ if radiated from the first light emitting diode 1 with light having a frequency $f_1 - \Delta f$ radiated from the second light emitting diode 3, a signal having a frequency $f_1$, the amplitude of which varies with the frequency $\Delta f$, is generated in the first light receiving diode 2. When an output from the first light receiving diode 2 is then detected to extract a component of the frequency $\Delta f$ and pass the component through the waveform setting unit 20, a signal having variations in phase of $\theta_1 - \theta_3 - \phi_{1\Delta}$ can be obtained. Therefore, a phase difference D' obtained from the counter 16 can be expressed by the equation, $$D' = (\theta_1 - \theta_3 + \phi_{1\Delta}) - (\theta_2 - \theta_4 - \phi_{2\Delta}) \quad (5)$$

When the phase difference C' is subtracted from the phase difference D', the following result can be obtained.

$$D' - C' = \theta_1 - \theta_2 + \theta_4 - \theta_3 \theta_{3\Delta} + \theta_{4\Delta} \quad (6)$$

Since $\theta_2, \theta_3, \theta_4, \theta_{3\Delta}, \theta_{4\Delta}$ are known, $\theta_1$ can be determined. The same computation is carried out with respect to the frequency $f_2$, and the two results are totaled to obtain a final measurement value.

FIG. 4 shows a further embodiment of the present invention. In this embodiment, a second light emitting diode is adapted to radiate the modulated light, the frequency of which is higher than that of the modulated light from a first light emitting diode by $\Delta f$, and the modulated light, the frequency of which is lower than that from the modulated light from the first light emitting diode by $\Delta f$. Thus, the light entering the first and second light receiving diodes is hetrodyned, in which the amplitude of the light varies with the frequency $\Delta f$, so that only a component of the frequency $\Delta f$ is processed as an electric signal in the first and second light receiving systems.

In this embodiment, a second frequency synthesizer 41 is provided in addition to a first frequency synthesizer 14. The first frequency synthesizer 14 is adapted to receive a signal of a frequency $f_1$ from an oscillator 11 and a signal of a frequency $\Delta f$ from a divider 12 to generate a signal of a frequency of $f_1 - \Delta f$ or $f_2 - \Delta f$. The second frequency synthesizer 41 is adapted to generate a signal of a frequency $f_1 + \Delta f$ or $f_2 + \Delta f$. The outputs from these synthesizers 14 and 41 are applied to a second selector circuit 42, from which a signal of a frequency $f_1 - \Delta f$, $f_2 - \Delta f$, $f_1 + \Delta f$ or $f_2 + \Delta f$ is applied to the second light emitting diode 3 in accordance with a signal from a processing and control unit 43. When a signal of a frequency $f_1$ is applied to the first light emitting diode 1, a signal of a frequency $f_1 - \Delta f$ or $f_1 + \Delta f$ is applied to the second light emitting diode 3. When a signal of a frequency $f_2$ is applied to the first light emitting diode 1, a signal of a frequency $f_2 - \Delta f$ or $f_2 + \Delta f$ is applied to the second light emitting diode 3. Accordingly, heterodyned signals, the amplitudes of which vary with a frequency $\Delta f$, are generated in the first light receiving diodes 2 and 4. The first and second detectors 31 and 32 are adapted, in the same manner as the corresponding parts in the preceding embodiment, to detect output signals from the first and second light receiving diodes 2 and 4, and output a sine-wave signal of a frequency $\Delta f$. The sine-wave signal of a frequency $\Delta f$ is converted to a rectangular-wave signal by first and second waveform setting units 20 and 23, and the rectangular-wave signal is applied to the counter 16. The construction of the other parts is identical with that in the preceding embodiment.

The variations in phase occurring in the first light emitting system consisting of the first light emitting diode 1, divider 12, and first selector circuit 13, and the second light emitting system consisting of the second light emitting diode 3, first and second frequency synthesizers 14 and 41, and second selector circuit can be eliminated by a mechanism for applying the light from the first and second light emitting diodes to the first and second light receiving diodes simultaneously, and measuring the difference between the phases of signals from the first and second light receiving systems with the counter. The variations in phase occurring in the first light receiving system consisting of the first light receiving diode 2, first detector 31, and first waveform setting unit 20, and the second light receiving system consisting of the second light receiving diode 4, second detector 32, and second waveform setting unit 23 can be eliminated by a mechanism for controlling the first and second selector circuits 13 and 42 and processing signals therefrom by the processing and control unit.

The elimination of the influence of variations in phase in the first and second light receiving systems will be described in detail. When the light of a certain frequency $f_1$ is radiated from the first light emitting diode 1 with the light of a frequency $f_1 - \Delta f$, which is lower than the frequency $f_1$ by $\Delta f$, radiated from the second light emitting diode 3, a phase difference E obtained in the counter 16 can be expressed by the following equation in the same manner as in the preceding embodiment [on the basis of the equation (5)].

$$E = \theta_1 - \theta_3 + \phi_{1\Delta} - \theta_2 + \theta_4 - \phi_{2\Delta} \ldots \quad (7)$$

When the light of a frequency $f_1 + \Delta f$ is radiated to the second light emitting diode 3, a phase difference F obtained in the counter 16 is:

$$F = -\theta_1 + \theta_{3'} + \phi_{1\Delta} + \theta_2 - \theta_{4'} - \phi_{2\Delta} \ldots \quad (8)$$

Therefore, when the computation of E−F is carried out, the following can be obtained:

$$E - F = 2\theta_1 - 2\theta_2 - \theta_3 - \theta_{3'} + \theta_4 + \theta_{4'} \ldots \quad (9)$$

Since the items excluding $\theta_1$ are known, $\theta_1$ can be determined. When this computation is carried out with respect to both of the frequencies $f_1$ and $f_2$, or more frequencies as necessary, a desired measurement result can be obtained. When, in this embodiment, the first light emitting diode 1 is modulated by, for example, two frequencies $f_1$ and $f_2$, it is not strictly necessary that the second light emitting diode 3 be modulated by four frequencies $f_1 - \Delta f$, $f_2 - \Delta f$, $f_1 + \Delta f$, $f_2 + \Delta f$; the second light emitting diode 3 may be modulated by three kinds of frequencies, for example, $f_1 - \Delta f$, $f_2 - \Delta f$, $f_1 + \Delta f$, out of the above four frequencies. In this case, the computation of E−F with respect to the first frequency $f_1$ is carried out to determine $\theta_1$, and the computation of E+F is carried out on the basis of the value obtained with respect to the first frequency $f_1$ to obtain the following result.

$$E + F = 2(\phi_{1\Delta} - \phi_{2\Delta}) + \theta_{3'} - \theta_3 + \theta_4 - \theta_{4'} \ldots \quad (10)$$

Since $\theta_{3'}$, $\theta_3$, $\theta_4$, $\theta_{4'}$ are known, $\phi_{1\Delta} - \phi_{2\Delta}$ can be determined. When $\phi_{1\Delta} - \phi_{2\Delta}$ is subtracted from the equation obtained with respect to the second frequency $f_2$, the members $\phi_{1\Delta}$ and $\phi_{2\Delta}$ can be eliminated.

In the range finder according to the present invention described above, the shifting of optical paths and the controlling of modulated light are carried out by controlling the light sources, for example, light emitting diodes in all cases. Therefore, such a controlling operation can be practiced in an extremely short period of time of not more than 1 μsec. Thus, the optical range finder according to the present invention permits, when the range finder and an object are moved relatively as mentioned in a previous paragraph, conducting measurement of a distance of the object in strict accordance with the movements thereof, unlike the conventional range finder of this kind. Since the range finder according to the present invention is not provided with a movable unit, reliability is improved. A conventional optical range finder has a serious problem concerning the fluctuations of the amount of variations in phase in the light source as mentioned previously. According to the present invention, the optical path is divided in two, and the difference between the phases therein is determined at the same time that the measurement of a distance is conducted. Thus, the present invention permits settling the abovementioned problem and greatly improving the measuring accuracy.

In the second and third embodiments of the present invention, the light is utilized for conversion of frequencies. Therefore, the phase in each light receiving system varies in the same manner irrespective of the frequency of the modulated light in use. When the modulated light of a plurality of kinds of frequencies is used, the measurement (which will be hereinafter referred to as "correcting measurement") of a phase difference for eliminating a phase difference occurring due to each block is conducted once. This method can be applied to a plurality of distance-measuring operations using different frequencies. This allows the accuracy of the range finder with respect to various measuring conditions to be further improved. Moreover, the present invention, which employs a method of converting frequencies by utilizing the light, has more advantages as follows. In general, the response time of a light receiving element for use in converting light into an electric current, for example, a light receiving diode varies depending upon each part of the surface thereof. Accordingly, when the position of a light receiving element is varied at the instant, at which the modulated light enters the element, corresponding variations in phase occur in the output therefrom. That is to say when conversion of frequencies is carried out in an electric system, the phase including variations in phase increases in the direction of the time axis. On the other hand, the position, in which the modulated light enters the light receiving surface of the light receiving element, is determined by the position of the corner cube with respect to the optical axis of the optical range finder body. In a conventional optical range finder, in which conversion of frequencies is carried out by an electric system, the collimation of a range finder body with respect to the corner cube is limited. In the optical range finders in the second and third embodiments of the present invention, in which the conversion of frequencies is carried out by utilizing the light, such as increase in the phase in the time axis as mentioned above occurs when or before the modulated light enters the light receiving elements, so that the above-mentioned limitation on the collimation of the range finder body can be lessened to a great extent.

In the third embodiment of the present invention, the measurement of a distance is always carried out by using the modulated light supplied through the distance measuring optical path as mentioned previously, and a value of the correcting measurement referred to above can be determined on the basis of the results of a distance measuring operation (for determining a phase difference occurring due to the distance measuring optical path and each block). This allows the measuring time to be shortened, and the adaptability of the range finder with respect to the condition of an object to be improved. Moreover, constantly using the modulated light supplied through the distance measuring optical path has the following advantages. The variations in phase occurring in the light receiving system are generally influenced by the intensity of the incident light. A conventional optical range finder is provided with a means (not shown) for varying the quantity of light, which is used to make the light from the inner optical path and the light from the distance measuring optical path agree with each other. Namely, when there is a difference between the intensity of the incident light used for the correcting measurement and the intensity of the incident light used for the distance measurement, the amounts of variations in phase occurring in the light measuring system vary from each other. To eliminate such differences, the means mentioned above for varying the quantity of light is used. Using such a means constitutes one limiting condition for an operation of the range finder. In the third operating system according to the present invention, the distance measurement includes the correcting measurement as mentioned previously. In other words, the distance measurement and correcting measurement are always practiced in the form of distance measurement. Therefore, the above-mentioned limiting condition can be naturally eliminated.

In the operations of the range finder according to the present invention described above, not less than one correcting measurement is included in one distance measurement but the correcting measurement may be carried out once every few mutiples of (N) of the distance measurement. In the range finder according to the present invention, the influence of fluctuations of an amount of variations in phase, which is said to be the greatest in the light sources, can be eliminated without carrying out any correcting measurement. Therefore, when the optical range finder according to the present invention is used with the correcting measurement carried out once every N times of distance measurement, the adaptability of the range finder with respect to the condition of an object can be improved without lowering the accuracy thereof.

The positional relation between the two light receiving sources and two light emitting sources in the embodiments can be set arbitrarily by interposing optical fibers therebetween. Also, the configuration of the four optical paths can be set arbitrarily provided that the conditions for transmitting the modulated light are maintained properly, i.e. provided that the modulated light from the two light sources is applied to the two light receiving sources simultaneously. For example, when the first embodiment is employed, the second reference optical path can be used as a second distance measuring optical path. Namely, two systems of distance measuring optical paths can be formed. A phase difference obtained on the basis of the equations (1) and (2) in the embodiment can be expressed similarly as follows.

$$A' - B' = \theta_{11} + \theta_{41} - \theta_{21} - \theta_{31}$$

If the length of the second distance measuring optical path is equal to that of the distance optical path in the embodiments, $A' - B' = 2\theta_{11} - \theta_{21} - \theta_{31}$. When the member $(-\theta_{21} - \theta_{31})$ is processed in the same manner as in the embodiment, $2\theta_{11}$ can be determined. The value of $2\theta_{11}$ is then halved to determine $\theta_{11}$. Thus, even when two systems of distance measuring optical paths are used, a distance measuring operation can be conducted in accordance with the first embodiment. The frequency synthesizers used in the first and second embodiments are adapted to output a frequency $f_n - \Delta f$. They may be adapted to generate a frequency $f_n + \Delta f$. The two light emitting sources may not have the same characteristics; they may consist of, for example, light emitting elements having different characteristics of wavelength of the light. The two light receiving sources may not have the same characteristics, either.

The invention has thus been shown and described with reference to specific embodiments, however, it should be noted that the invention is in no way limited to the details of the illustrated arrangements but changes and modifications may be made without departing from the scope of the appended claims.

I claim:

1. An optical range finder comprising:
   a first light emitting system;
   a second light emitting system;
   a first light receiving system for receiving light radiated from the first and second light emitting systems;
   a second light receiving system for receiving light radiated from the first and second light emitting systems;
   means defining a measuring optical path for introducing light radiated from the first light emitting system into the first light receiving system via a point to be measured;
   means defining a first inner reference optical path for introducing light radiated from the first light emitting system into the second light receiving system;
   means defining a second inner reference optical path for introducing light radiated from the second light emitting system into the first light receiving system;
   means defining a third inner reference optical path for introducing light radiated from the second light emitting system into the second light receiving system;
   control means for controlling the first and second light emitting systems in a manner which includes a first and second step, the first step including the second light emitting system radiating light having a modulation frequency of either $(f - \Delta f)$ or $(f + \Delta f)$ at the same time as the first light emitting system radiates light having a modulation frequency $(f)$, and the second step including the second light emitting system radiating light having a modulation frequency $(\Delta f)$ when the first light emitting system is not radiating light, wherein the modulation frequency $(\Delta f)$ is significantly lower than the modulation frequency $(f)$;
   phase difference detecting means for determining a first phase difference between the first and second light receiving systems when the first step is carried out, and a second phase difference between the first and second light receiving systems when the second step is carried out; and
   processing means for eliminating a phase delay resulting from the electrical elements of the optical range finder by subtracting the second phase difference from the first phase difference.

2. The optical range finder as defined in to claim 1, wherein the first light emitting source is adapted to radiate at least two kinds of light having different modulation frequencies $(f_1)$ and $(f_2)$.

3. The optical range finder as defined in claim 1, wherein:
   the first light emitting system includes a first light emitting source and first selector means for selectively providing the first light emitting source with the modulation frequency $(f)$; and
   the second light emitting system includes a second light emitting source, frequency synthesizer means for synthesizing the modulation frequencies $(f)$ and $(\Delta f)$ to produce the modulation frequencies $(f + \Delta f)$ or $(f - \Delta f)$, and a second selector means for selectively providing the second light emitting source with one of the modulation frequencies $(\Delta f)$, $(f-\Delta f)$, or $(f+\Delta f)$, wherein the first and second selector means are controlled by the control means.

4. An optical range finder comprising:
 a first light emitting system;
 a second light emitting system;
 a first light receiving system for receiving light radiated from the first and second light emitting systems;
 a second light receiving system for receiving light radiated from the first and second light emitting systems;
 means defining a measuring optical path for introducing light radiated from the first light emitting system into the first light receiving system via a point to be measured;
 means defining a first inner reference optical path for introducing light radiated from the first light emitting system into the second light receiving system;
 means defining a second inner reference optical path for introducing light radiated from the second light emitting system into the first light receiving system;
 means defining a third inner reference optical path for introducing light radiated from the second light emitting system into the second light receiving system;
 control means for controlling the second light emitting system to selectively radiate light having a modulation frequency $(f-\Delta f)$ and light having a modulation frequency $(f+\Delta f)$ at the same time as the first light emitting system radiates light having a modulation frequency $(f)$, wherein the modulation frequency $(\Delta f)$ is significantly lower than the modulation frequency $(f)$;
 phase difference detecting means for determining a first phase difference between the first and second light receiving systems when the first light emitting system radiates the modulation frequency $(f)$ and the second light emitting system radiates the modulation frequency $(f-\Delta f)$, and a second phase difference between the first and second light receiving systems when the first light emitting system radiates the modulation frequency $(f)$ and the second light emitting system radiates the modulation frequency $(f+\Delta f)$; and
 processing means for eliminating a phase delay resulting from the electrical elements of the optical range finder by subtracting the second phase difference from the first phase difference.

5. The optical range finder as defined in claim 4, wherein the first light emitting system is adapted to radiate at least two kinds of light having different modulation frequencies $(f_1)$ and $(f_2)$.

6. The optical range finder as defined in claim 4, wherein:
 the first light emitting system includes a first light emitting source and first selector means for selectively providing the first light emitting source with the modulation frequency $(f)$; and
 the second light emitting system includes a second light emitting source, first frequency synthesizer means for synthesizing the modulation frequencies $(f)$ and $(\Delta f)$ to obtain the modulation frequency $(f-\Delta f)$, second frequency synthesizer means for synthesizing the modulation frequencies $(f)$ and $(\Delta f)$ to obtain the modulation frequency $(f+\Delta f)$, and second selector means for selectively providing the second light emitting source with either modulation frequency $(f-\Delta f)$ or $(f+\Delta f)$, wherein the first and second selector means are controlled by the control means.

* * * * *